April 3, 1928.                                                                  1,664,443
R. W. WILLIAMS ET AL
OVEN
Filed Aug. 13, 1925
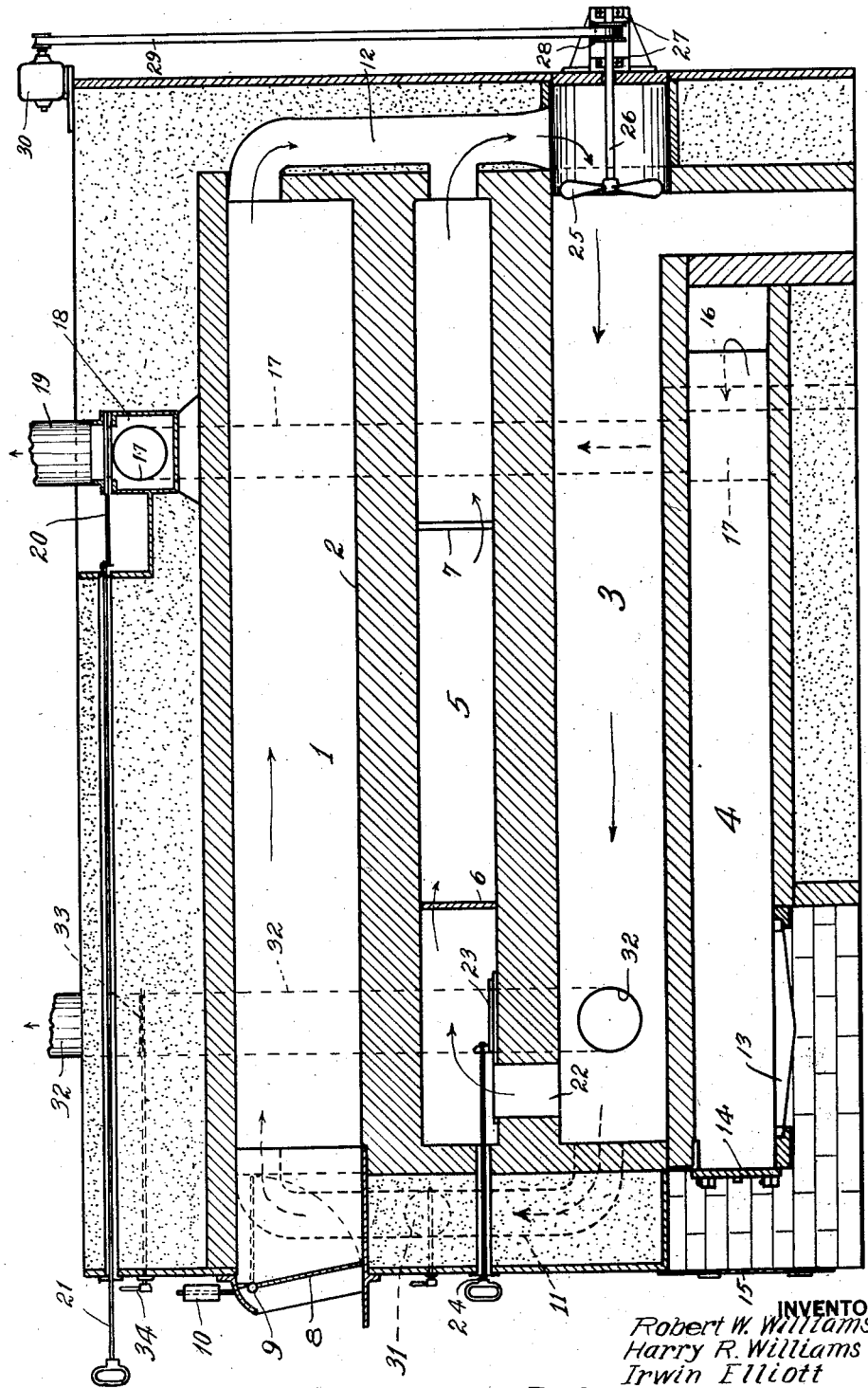
INVENTORS.
Robert W. Williams
Harry R. Williams  and
Irwin Elliott
By Stockbridge & Borst
ATTORNEYS.

Patented Apr. 3, 1928.

1,664,443

UNITED STATES PATENT OFFICE.

ROBERT W. WILLIAMS AND HARRY R. WILLIAMS, OF BROOKLYN, AND IRWIN ELLIOTT, OF NEW YORK, N. Y., ASSIGNORS TO WILLIAMS OVEN MANUFACTURING COMPANY, A CORPORATION OF NEW YORK.

OVEN.

Application filed August 13, 1925. Serial No. 49,974.

This invention relates to baking ovens and methods for controlling the temperatures of the same. More particularly it relates to ovens utilized for commercial baking purposes.

Two types of commercial baking ovens are now in common use, one known as the direct oven in which the heat is applied directly to the baking chamber, such as by means of gas flames, high pressure steam pipes, or merely by a wood or coal fire built directly in the baking chamber; the other known as the indirect oven and operating by heat supplied to the baking chamber by means of conduction and radiation from heat flues around the baking chamber. The indirect oven has attained considerable popularity by reason of the fact that it is the more economical and gives a more uniform and solid heat, but on the other hand the direct system allows of greater flexibility and more rapid change of temperature, particularly when gas flames are used since the burners may be quickly turned on or off or varied to create a change in the size of the flames. Where a variety of goods are baked, the ability to control and change the temperature of the baking chamber quickly is a very desirable feature.

An object of this invention is to provide an improved baker's oven which will possess the best features of both systems; which will provide a solid, lasting heat stored in flues as in the indirect type; which will permit one to quickly alter the temperature of the baking chamber and hearth at will; which will permit of any desired variation in the temperatures of the baking chamber and the hearth or floor of the same; and which will be relatively simple, efficient, practical and inexpensive.

A further object is to provide an improved method of heating the baking chambers of commercial baking ovens by which a more effective, rapid and variable control of the temperatures in the baking chamber and floor thereof may be obtained selectively; and which will be exceptionally simple, practical, efficient, and effective.

Various other objects and advantages will be apparent from the following description of an embodiment of the invention, and the novel features will be particularly pointed out hereinafter in connection with the appended claims.

In the accompanying drawing we have illustrated a sectional elevation of a baker's oven constructed in accordance with the invention.

In the illustrated embodiment of the invention, the oven structure is provided with a baking chamber 1 having a hearth or floor 2, a heating chamber 3 and a flue or fire box 4. The floor or hearth 2 beneath the baking chamber is provided with one or more flues 5 by means of which the hearth or floor of the baking chamber may be heated. For simplicity but a single flue is illustrated, but this flue is provided with baffles 6 and 7 which extend transversely across the flue alternately from opposite side walls but stop short of the wall opposite that from which they extend, so as to provide communication from opposite sides of each baffle, but with the communication between different sections of the heating flue provided at opposite sides of the flue passage. Thus any gases passing through the heating flue will be compelled to take a tortuous path therethrough, thus bringing the gases in contact with practically the entire area of the flue.

The baking chamber is provided with a suitable door 8 movable from the closed position shown in full lines on the drawing, to open position shown in dotted lines, in order to provide access to or for inspection of the baking chamber. The door is suitably mounted, such as upon a rotary pivot rod 9, and may be counterbalanced by a weight 10, so that it will readily remain in either open or closed position. The oven structure is provided with a conduit 11 which connects one end of the heating chamber 3 with the door end of the baking chamber 1, the conduit 11 preferably entering the baking chamber in a direction toward the rear. Another conduit 12 connects the rear end of the baking chamber with the opposite end of the heating chamber.

The heating chamber is supplied with heat from the flue or fire box 4, preferably by radiation and conduction, and the contained air which is heated thereby is circulated through the baking chamber by means of the flues 11 and 12. The flue or fire box 4 may be of any suitable construction, but in the embodiment illustrated, it is provided at one end with a grate 13 upon which a fire may be built and maintained, access to the grate end of the box being obtained by an inside fire door 14 and an outside fire door 15. The burning gases from the fuel on the grate 13 pass along the flue box and thence by a flue 16 to a chimney flue 17, the latter passing upwardly through the structure into a damper box 18 which communicates with a chimney pipe 19. The damper box is provided with a suitable damper valve 20 which is controlled by a rod 21, so that it may be opened or closed to various extents in the usual or any suitable manner. In the particular type illustrated, the valve is a sliding valve which is pulled open to various extents by merely pulling outwardly upon the rod 21.

The oven structure is also provided with a conduit or passage 22 which connects the heating chamber 3 with one end of the heating flue 5, the opening of this conduit or passage 22 into the heating flue being controlled by a suitable valve 23 operated by a rod 24. In the type illustrated the valve 23 is a sliding valve which may be operated into closed position to various extents by merely pulling outwardly upon the rod 24. The other end of the heating flue is in communication with the flue 12 from the baking chamber. The flue 12 is provided at a suitable point, such as at its entrance into the heating chamber 3, with a blower 25 such as a fan carried by a shaft 26 extending through a wall of the structure. The outwardly extending end of the shaft 26 is rotatably supported in bearings 27, and carries a pulley 28 which is driven by a belt 29. The belt 29 is driven from a suitable source of power such as an electric motor 30 conveniently mounted upon the structure. Obviously any other source of power may be provided for the blower, or the motor may be directly geared to the shaft 26.

When the blower is operated, it will force the air through the heating chamber 3 and through the conduits or passages 11 and 22 into the baking chamber and the heating flue, the circulation being completed through the common conduit 12 connecting the baking chamber and heating flue with the heating chamber 3. The conduit or passage 11 is preferably controlled by a suitable damper or valve 31, so that by suitably varying the valves 31 and 23, the relative proportions of hot air which pass through the baking chamber and heating flue may be varied and controlled.

The structure may also be provided with a conduit or passage 32 connecting the heating chamber 3 with the exterior of the structure and discharging directly into the air. This conduit or passage 32 is controlled by a suitable damper or valve 33 which is operated or manipulated by a suitable controlling handle 34.

In the operation of an oven constructed in this manner, let it be assumed that all of the dampers or valves, with the exception of the valve 20 of the damper box, are closed, the valve or damper 20 being open to permit of the passage of the smoke and combustion gases from the flue to the chimney. When a fire is provided in the flue box, the hot gases will pass through the box 4 and thence through the flue 16 to the chimney flue 17, and thence to the chimney. The hot gases while passing to the chimney will heat the walls of the heating chamber 3, so that by conduction and radiation the air in the heating chamber 3 will be heated.

If the blower 25 is operated and the valve or damper 31 is opened, the hot air in the heating chamber will be forced through the passage or conduit 11 into the baking chamber at the door end thereof, thence through the baking chamber to the rear end thereof, and through the conduit 12 back to the blower and the heating chamber. The hot air circulating through the baking chamber will heat the walls thereof and bake any goods which are placed therein. The baking chamber may be preheated by circulating the hot air therethrough before the goods to be baked are placed therein.

If additional heat is desired for the hearth or floor, the valve or damper 23 may be opened by pushing rearwardly upon the rod 24, and thereupon a portion of the hot air will pass through the conduit or passage 22 and through the heating flue 5, leaving the latter and returning to the heating chamber through the common conduit or passage 12. The hot air will be circulated both through the baking chamber and the heating flue in the floor of the chamber, so that by varying the dampers or valves 31 and 23, the relative proportions of the hot air passing directly through the baking chamber 1 or through the heating flue 5 may be varied as desired. Thus a very effective control of the temperature within the baking chamber and for the hearth or floor of the chamber is possible. Of course, by closing damper 31 and opening valve 23, all the hot air may be passed through the heating flue in the hearth or baking oven floor.

When one desires to lower the temperature of the baking chamber or hearth, it is merely necessary to open the baking chamber door 8, close the dampers or valves 23 and 31, and open the damper 33 whereupon the air from the heating chamber 3 will be forced through the conduit or passage 32 to the exterior of the structure and discharged into the air. The air thus displaced from the heating chamber will be replaced by cool air drawn in through the open door of the baking chamber and circulated through the heating chamber by the blower which is continued in operation. This is continued until the temperature falls to the desired extent, whereupon the valve 33 will be closed and the valves 23 and 31 again opened to return the heat to the baking chamber and flue.

By the circulation of the heated air in this manner a very uniform heat will be obtained in the baking chamber and over the hearth and floor thereof. If goods are to be baked which require a stronger bottom heat the valve or damper 23 may be opened, and if necessary the damper 31 may be partially or entirely closed so as to direct all or most of the heat through the heating flue in the floor or hearth. Absolute temperature control is thus possible for the baking chamber and flue. It will be noted that with an oven constructed in this manner, a wide variety of goods may be baked therein in rapid succession without delays caused by waiting for temperature changes to occur as in other types of ovens.

While the heating chamber is illustrated as incorporated in the actual oven structure in which the baking chamber is placed, it will be understood that this is optional, and that the air may be heated at a point distant from the baking chamber and hearth flues and circulated therethrough through suitable conduits in the manner described.

It will be obvious that various other changes in the details, which have been herein described and illustrated for the purpose of explaining the nature of the invention, may be made by those skilled in the art within the principle and scope of the invention as expressed in the appended claims.

We claim:—

1. In a baker's oven, a structure having a baking chamber and a heating chamber, conduits connecting said chambers at the front and rear ends to permit of a circulation of air through both of said chambers successively, means for supplying heat to said heating chamber, means for causing a forced circulation of the air between said chambers through said conduits successively, a valve in one of said conduits between the chambers for regulating the quantity of circulation between the chambers, said baking chamber having a door at the front end to admit atmospheric air to said chamber for circulation therethrough to the rear conduit for passage to the heating chamber for cooling the baking chamber, and a conduit connected to said heating chamber for receiving the air therefrom and conducting it out of the structure when the baking chamber door is opened and said valve is at least partially closed, whereby the temperature of the baking chamber may be quickly reduced.

2. In a baker's oven, a structure having a baking chamber and a heating chamber, conduits connecting said chambers at the front and rear ends to permit of a circulation of air through both of said chambers successively, means for supplying heat to said heating chamber, means for causing a forced circulation of the air between said chambers through said conduits successively, a valve in one of said conduits between the chambers for regulating the quantity of circulation between the chambers, said baking chamber having a door at the front end to admit atmospheric air to said chamber for circulation therethrough to the rear conduit for passage to the heating chamber for cooling the baking chamber, a conduit connected to said heating chamber for receiving air from said heating chamber and conducting it out of the structure when the baking chamber door is opened and said valve is at least partially closed, whereby the temperature of the baking chamber may be quickly reduced, and a valve in said last named conduit for preventing unintentional escape of the hot air from said heating chamber.

3. In a baker's oven, a structure having a baking chamber, a heating chamber with a heating flue extending through the floor of the baking chamber, a door for said baking chamber, a conduit connecting the heating chamber with the door end of said baking chamber, a valve to control said conduit, another conduit connecting the heating chamber with one end of the heating flue under the floor of the baking chamber, a common conduit for connecting the rear end of the baking chamber and the corresponding end of the heating flue with the heating chamber, a blower for causing a circulation of heated air between said chambers through said conduits and to cause circulation of cooling air through the baking chamber into the heating chamber when said door is open and said valve is closed for cooling said chambers, and means for supplying heat to said heating chamber.

4. In a baker's oven, a structure having a baking chamber, a heating chamber, a heating flue extending through the floor of the baking chamber, a door for said baking chamber, a conduit connecting the heating chamber with the door end of said baking chamber, a valve to control said conduit, another conduit connecting the heating chamber with one end of the heating flue through the floor of the baking chamber, a common conduit for connecting the rear end of the baking chamber and the corresponding end of the heating flue with the heating chamber, means associated with said common conduit for causing a circulation of heated air between said chambers through said conduits, and to cause circulation of cooling air through the baking chamber into the heating chamber when said door is open and said valve is closed for cooling said chambers, and means for supplying heat to said heating chamber, said first named conduits connecting the heating chamber to the heating flue and the door end of the baking chamber being valve controlled, whereby the proportions of hot air conducted from the heating chamber to either the heating flue or baking chamber may be selectively varied.

5. In a baker's oven, a structure having a baking chamber, a heating chamber, a heating flue extending through the floor of the baking chamber, a door for said baking chamber, a conduit connecting the heating chamber with the door end of said baking chamber, a valve to control said conduit, another conduit connecting the heating chamber with one end of the heating flue through the floor of the baking chamber, a valve to control the last named conduit, conduit means connecting the rear end of the baking chamber and the corresponding end of the heating flue with the heating chamber, means associated with said conduit means for causing a circulation of air between said chambers through said conduits and conduit means, means for supplying heat to said heating chamber, whereby the proportions of hot air conducted from the heating chamber to either the flue or baking chamber may be selectively varied, and another valve controlled conduit connecting the heating chamber to the exterior of the structure, whereby when the baking chamber door is opened and the conduits connecting the heating chamber with the heating flue and baking chamber are closed, cold air may flow through the baking chamber to the heating chamber to cool the same to the desired extent.

In witness whereof, we hereunto subscribe our signatures.

ROBERT W. WILLIAMS.
HARRY R. WILLIAMS.
IRWIN ELLIOTT.